March 9, 1965   B. EDWARDS   3,172,159
CONTAINER MOLDING MACHINE
Original Filed Sept. 26, 1958   6 Sheets-Sheet 6

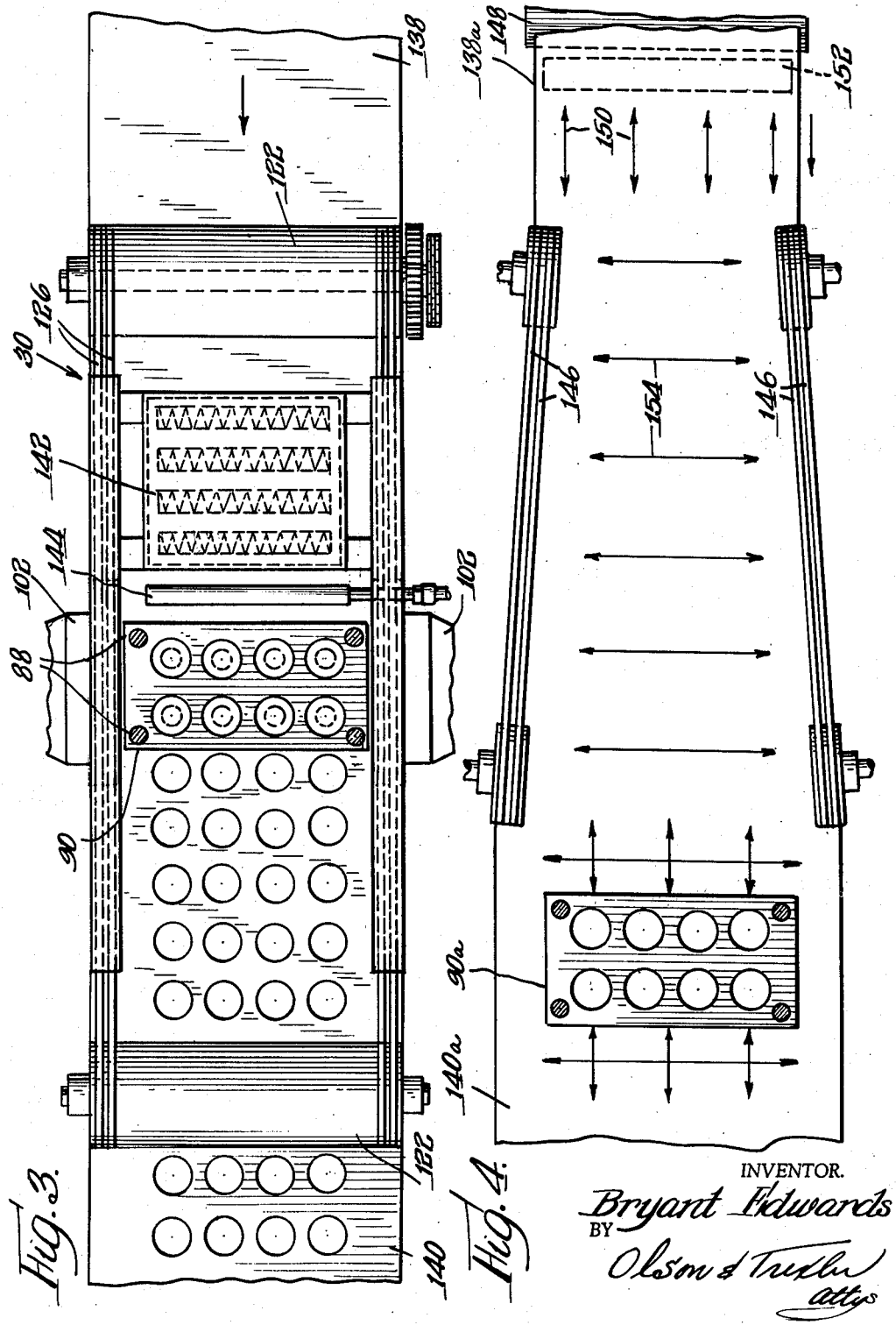

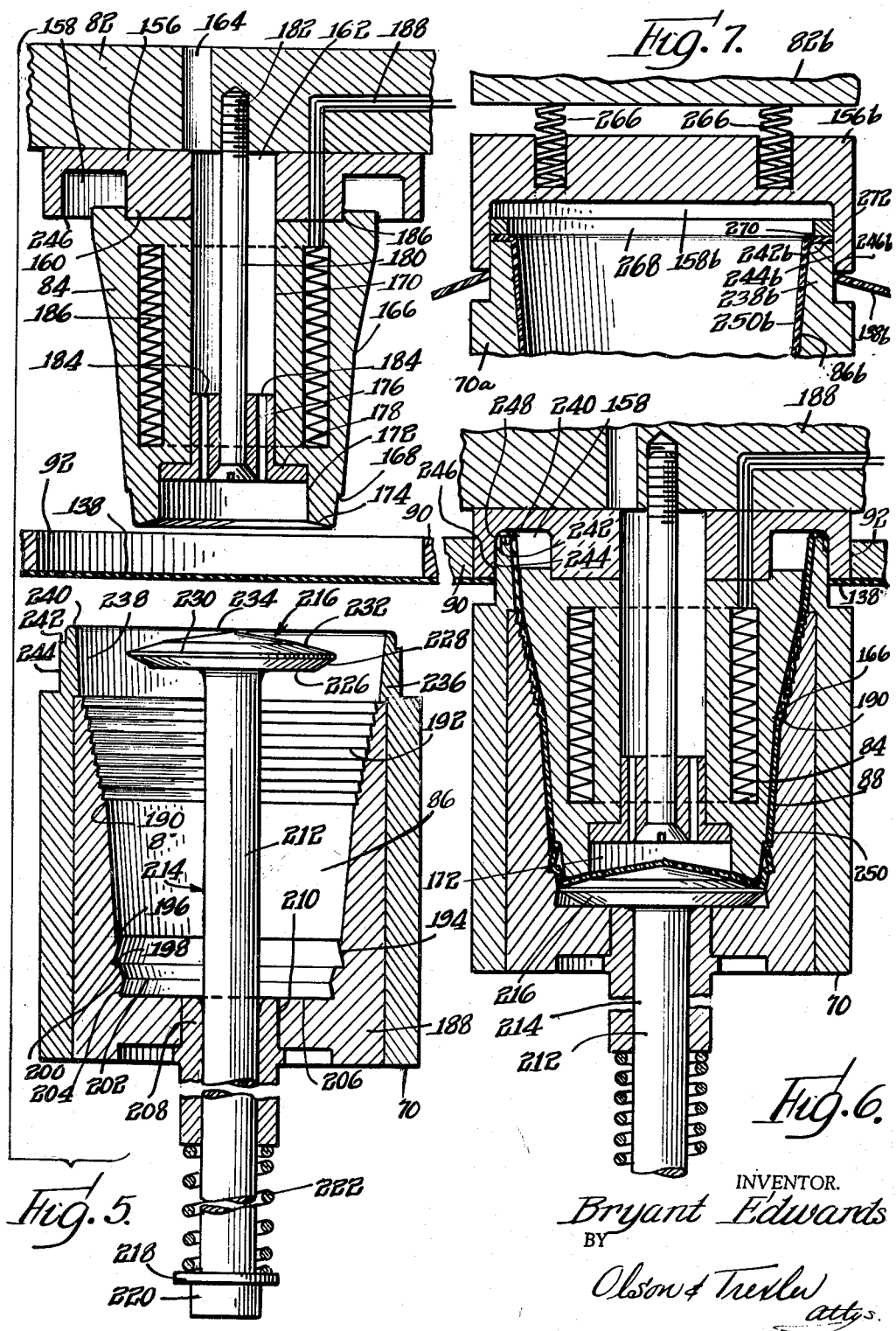

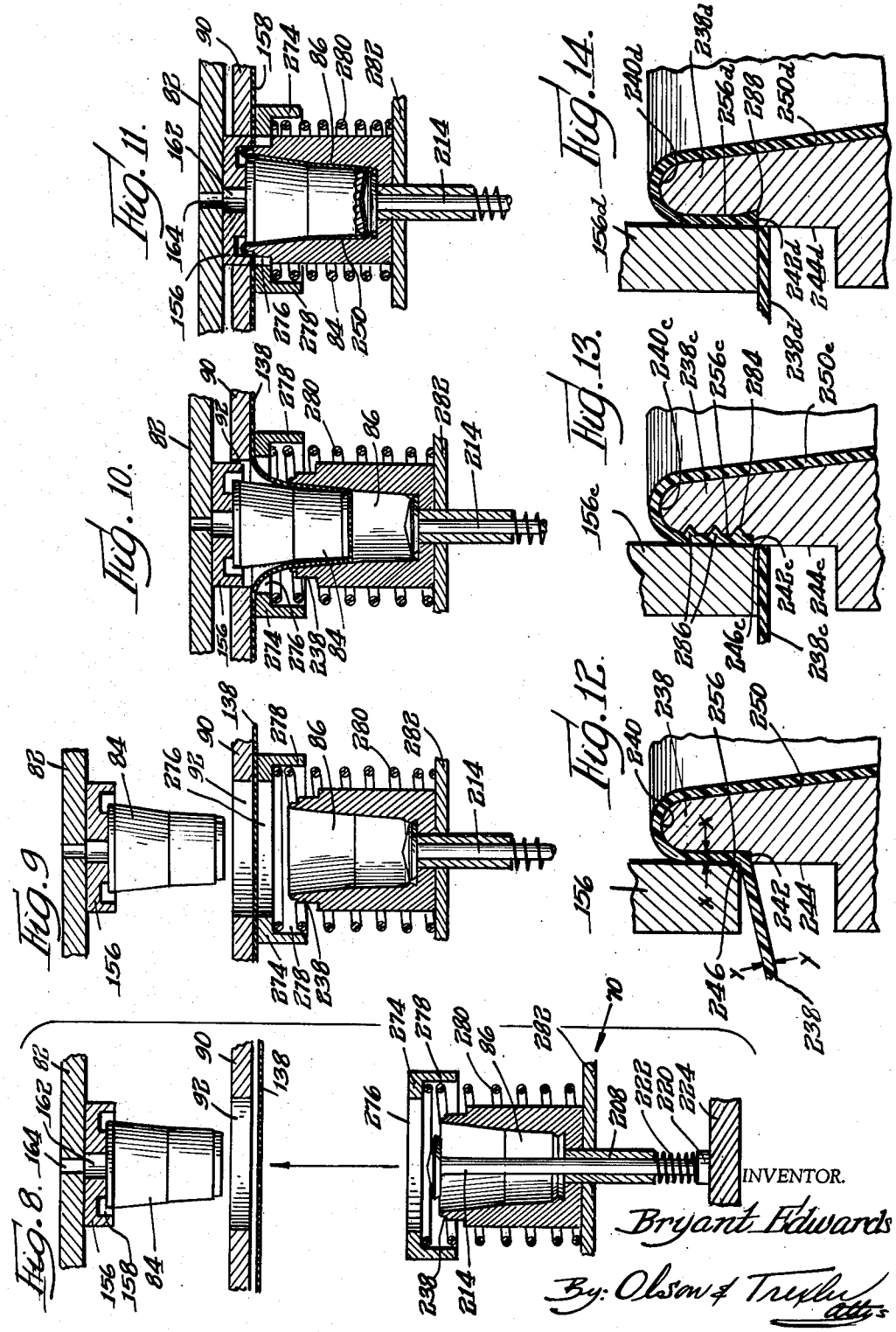

INVENTOR.
Bryant Edwards
BY
Olson & Trexler
attys

United States Patent Office 3,172,159
Patented Mar. 9, 1965

3,172,159
CONTAINER MOLDING MACHINE
Bryant Edwards, Clarendon Hills, Ill., assignor to Illinois Tool Works Inc., Chicago, Ill., a corporation of Delaware
Continuation of abandoned application Ser. No. 763,668, Sept. 26, 1958. This application Dec. 7, 1962, Ser. No. 243,166
10 Claims. (Cl. 18—19)

This invention is concerned with a machine for producing thin wall molded plastic containers such as cups and the like.

This application is a continuation of my application 763,668, initially copending herewith, and now abandoned.

It has been found that containers and the like can be efficaciously formed from sheet thermoplastic material by warming the material, mechanically drawing it to partially completed form, and completing the formation of the containers by blowing air under pressure thereinto in a cavity die or mold. This invention relates to improvements in a machine for so producing superior finished containers or the like of maximum strength and having substantially uniform wall thickness throughout.

It is an object of this invention to provide a machine for molding plastic containers and the like of sheet material wherein the sheet plastic is pre-stretched biaxially to accomplish molecular orientation leading to a stronger finished product.

Another object of this invention is to provide a machine for molding thin wall plastic items such as containers wherein the machine is provided with clamping means or support means for holding a given area of material before and during the mechanical drawing of the material, and before any portion of the sheet material engages a complementary mold or die.

It is a further object of this invention to provide improved mandrels or male die members in a machine for molding plastic containers and the like, which mandrels or male die members have controlled frictional and heat transfer characteristics to provide a superior product.

It is a further object to provide in a machine for molding thin walled containers and the like of sheet plastic material, improved means for sealing off and shearing selected areas of plastic sheet material from a sheet of stock.

Other and further objects and advantages of the present invention will be apparent from the following description when taken in connection with the accompanying drawings, wherein:

FIG. 3 is a horizontal cross-sectional view through the machine as taken along the line 3—3;

FIG. 4 is a view somewhat similar to FIG. 3 and showing a modification of the machine wherein the plastic sheet stock or web is stretched biaxially;

FIG. 5 is a vertical sectional view through the mold cavity and male member or mandrel before initial drawing of the sheet material as taken along the line 5—5 in FIG. 2;

FIG. 6 is a view similar to FIG. 5 following the mechanical drawing;

FIG. 7 is a fragmentary view similar to a portion of FIG. 6 showing a modification adapted to form outwardly directed flanges on the containers, rather than reversely bent rims;

FIGS. 8–11 are cross-sectional views corresponding to FIGS. 5 and 6 showing succeeding steps in the formation of a container;

FIG. 12 is a detailed view showing the sealing and cutting off of the container from the sheet stock;

FIG. 13 is a view similar to FIG. 12 showing a modification;

FIG. 14 is another view similar to FIG. 12 showing a further modification;

Figure 1:
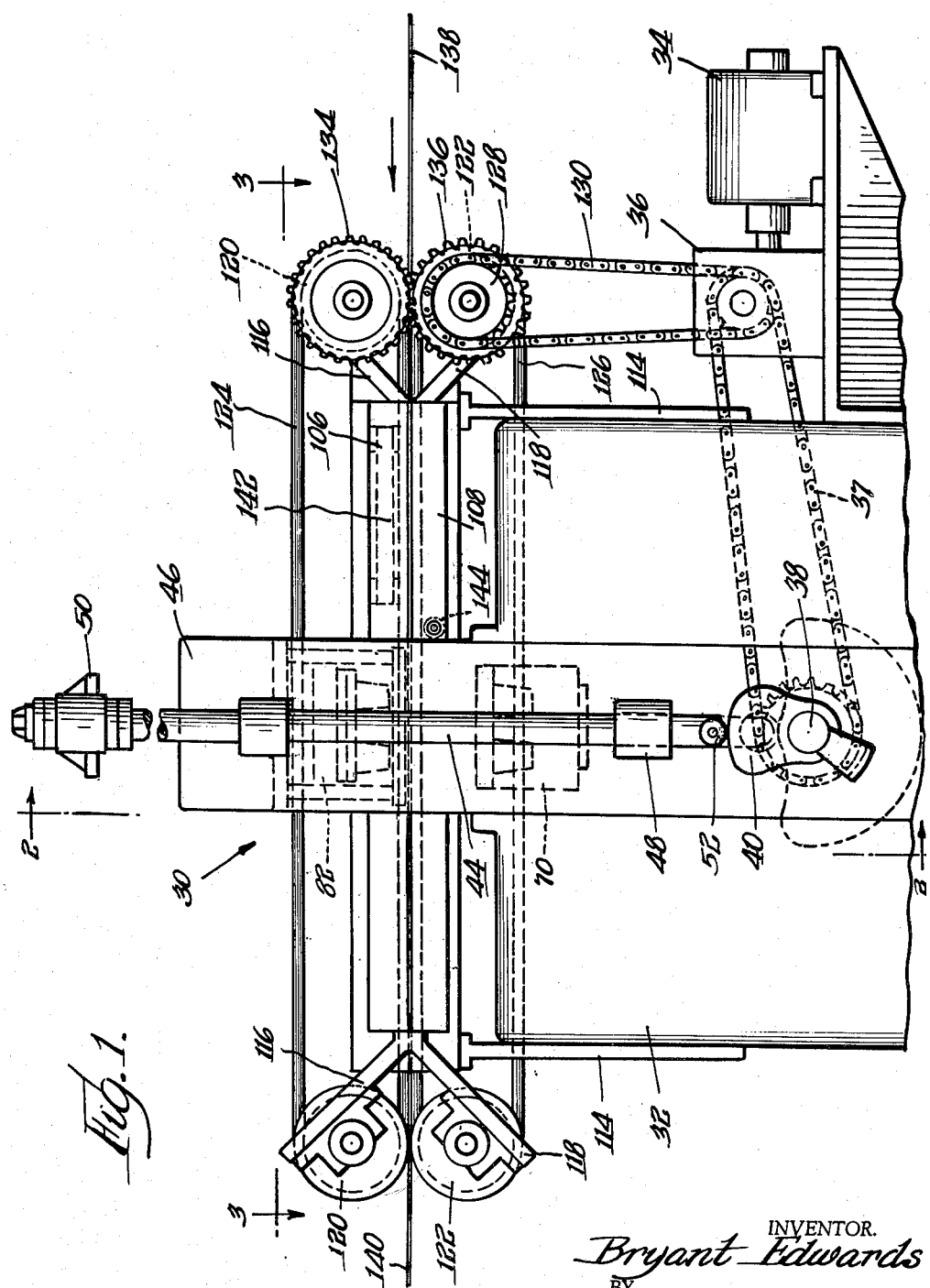
FIG. 1 is a side view of a machine constructed in accordance with the principles of this invention for making thin walled plastic containers such as cups.
Figure 2:
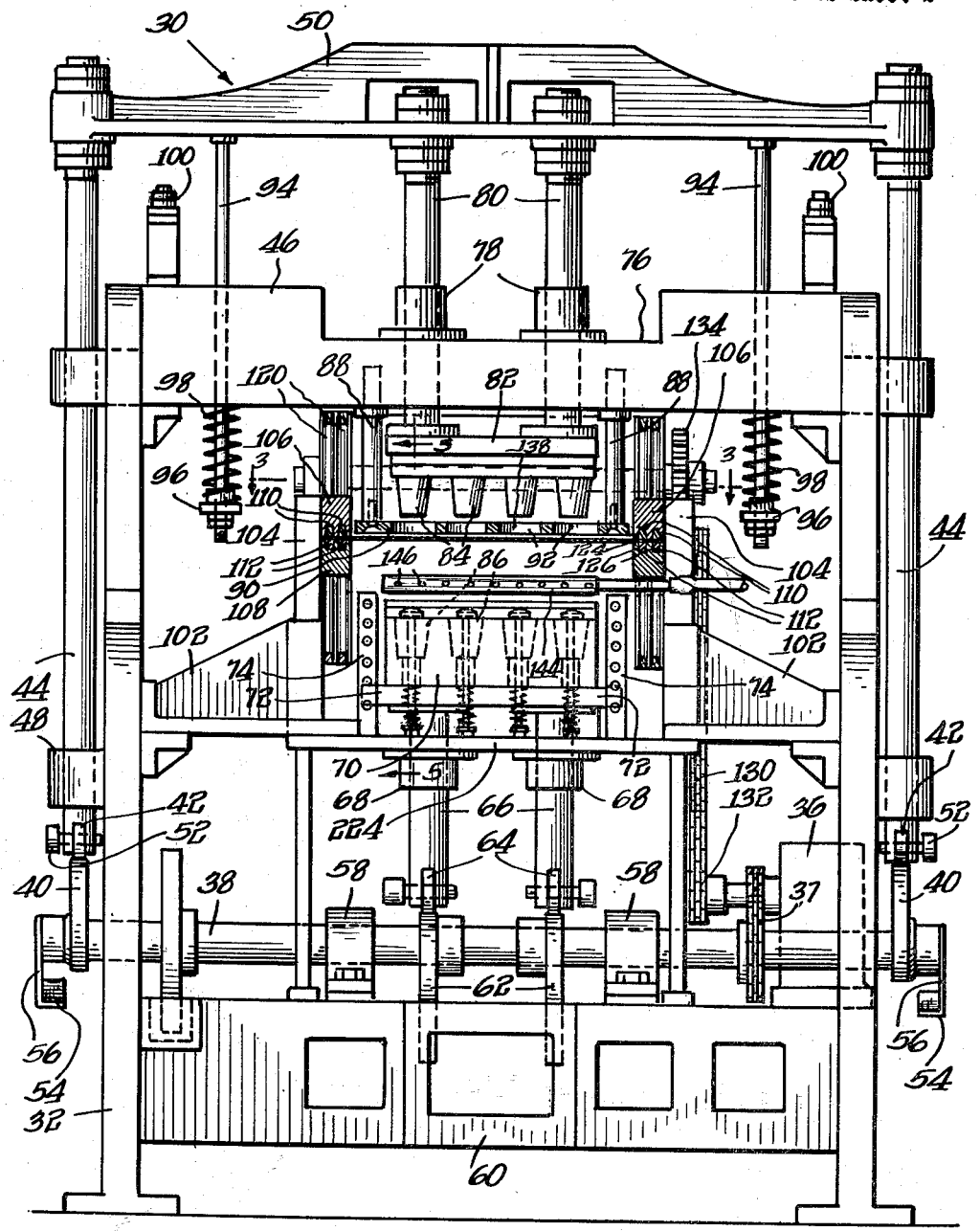
FIG. 2 is a vertical cross-sectional view through the machine as taken along the line 2—2 in FIG. 1.

Referring now in greater particularity to the drawings, and first to FIGS. 1–3, there is shown a machine 30 for molding containers, such as cups, from plastic sheet material. The machine includes a frame 32 having thereon a drive motor 34 driving a speed reducer 36. The speed reducer drives a chain 37 which in turn drives a shaft 38. The shaft 38 is provided at its opposite ends with cams 40 cooperable with cam followers or rollers 42 at the lower ends of push rods 44 journaled in a cross member 46 of the frame 32, and further guided by guides or sleeves 48 adjacent the lower ends of the push rods 44. The push rods 44 support at their upper ends a horizontal cross head 50. The push rods are provided with rollers 52 coaxial with the rollers 42, and these rollers are positively forced down by cam flanges 54 axially directed on arms 56 secured at the ends of the shaft 38 outwardly of the cams 40.

The shaft 38 is journaled in bearings 58 supported from a transverse portion 60 of the frame, the bearings being spaced in from the ends of the shaft. Between these bearings the shaft is provided with a pair of cams 62 cooperable with cam followers 64 at the lower ends of push rods 66 journaled in bushings or the like 68 on a fixed portion of the frame. A mold 70, having a plurality of cavities therein, and subsequently to be discussed in greater detail is supported at the tops of the push rods 66 for vertical movement as controlled by the cams 62. The mold or die 70 is provided with lateral extensions 72 cooperating with fixed members 74 on the frame 32 to guide the mold or die 70 in vertical movement.

The transverse frame member 46 is provided with a relieved central section 76 having a pair of bushings 78 mounted thereon. Posts or connecting rods 80 extend vertically through these bushings and through aligned apertures in the transverse frame member 46. The connecting rods or posts 80 are fixed at their upper ends to the cross head 50, and move vertically therewith. The connection is a screw set arrangement, as will be seen particularly in FIG. 2, and this allows for a certain amount of vertical adjustment. A molding head 82 is secured to the bottoms of the posts or connecting rods 80, and includes a plurality of downwardly directed mandrels or male die members 84 aligned with corresponding cavities 86 in the mold 70. In the specific illustrative embodiment, there are two rows of four mandrels, or eight mandrels in all.

Four posts 88 depend from the transverse frame member 46 adjacent the corners of the molding head 82, but spaced outwardly therefrom, and support a clamping plate 90. This plate is provided with a plurality of apertures 92 respectively aligned with the mandrels 84, and through which the mandrels extend in a molding operation, as hereinafter will be set forth. The plate further cooperates with parts of the mold 70 to secure a plastic sheet for molding, as will be set forth hereinafter.

A pair of rods 94 is mounted on the cross head 50 relatively adjacent the opposite ends thereof. The rods extend through suitable holes in the transverse frame member 46, and are provided at their lower ends with adjustable stops or spring anchors 96, conveniently comprising nuts and washers. A helical spring 98 encircles each rod and is compressed between the transverse frame member 46 and the corresponding stop or spring anchor or seat 96. Accordingly, the cross head 50 and the push rods 44 are urged resiliently down, whereby to hold the followers 42 resiliently against the cams 40. The transverse frame member 46 also is provided with fixed stops 100 adjacent its opposite ends and engageable with the cross head 50 to limit downward movement thereof.

The fixed frame parts supporting the mold guides 74, such frame parts hereinafter being identified by the numeral 102, are provided at their upper edges with upstanding supports 104 which support upper belt guides 106 and lower belt guides 108. The guides 106 and 108 are spaced apart only a very short distance, and are provided with pairs of confronting grooves 110 and 112, respectively.

The guides 106 and 108 further are supported at their ends by supports 114 upstanding from the frame. The ends of the guides are provided with oppositely extending and diverging supports comprising upper supports 116 and lower supports 118 provided with journals rotatably mounting a pair of spaced upper rollers 120 and a corresponding pair of spaced lower rollers 122. Each roller is provided with four V-grooves, one pair near each end, receiving two pairs of upper V-belts 124 and two pairs of lower V-belts 126.

The lower roller 122 at the entering end of the machine (the right end as viewed in FIGS. 1 and 3) is provided with a sprocket 128 driven by a chain 130 from a sprocket 132, the latter being intermittently driven by suitable mechanism incorporated in the speed reducer 36. Intermittent motion mechanisms are well known in the art, and any suitable type may be used. Further, the entering end rollers 120 and 122 are geared together by suitable meshing gears 134 and 136, whereby the belts 124 and 126 are driven intermittently and in synchronism.

A web or sheet 138 of plastic sheet material or stock is fed into the machine through the rollers 120 and 122 as the entering end of the machine is carried by the belts 124 and 126 past the molding head 82 and mold 70 and emerges from the machine through the discharge rollers 120 and 122 as scrap 140. The plastic sheet material preferably is of the thermoplastic variety, and polystyrene has been found to be satisfactory. The sheet material may be fed from a storage roll thereof, or preferably is fed directly from an extruder to the molding machine.

In order to insure proper plasticity of the sheet stock, there is provided an electric resistance heater 142 suitably supported beneath the web between the entering end of the machine and the mold and molding head. This heater conveniently may be supported from the lower belt guides 108.

In addition to the foregoing, there is provided immediately adjacent the entering end of the mold and molding head an air pipe 144 having jets in the side thereof at 146 directing air under pressure to blow finished containers away from the mold, and out of the machine.

A slight modification of the machine is shown in FIG. 4. It has been found that the resulting container is stronger if the plastic sheet material is stretched biaxially before molding thereof. Thus, the plastic sheet material is gripped along the opposite edges, as by diverging pairs of belts 146 in FIG. 4. Means is provided for restraining or holding back the sheet material, and is illustrated as being a roller 148. The surface speed of the roller is less than the speed of the belts 146, and hence the belts cause the material to be stretched longitudinally as indicated by the arrows 150. According to one form of the invention the plastic sheet material is fed directly from an extruder, and hence is still warm and pliable. However, in some instances, whether from an extruder or from a storage roll, the plastic may have to be heated to a certain extent, and heating means, such as electric heaters are provided as necessary. One such heater is indicated at 152. In addition to the aforesaid longitudinal stretching of the material, a transverse stretching is effected as indicated by the arrows 154 by the divergence of the pairs of belts 146. It will be understood that there is a pair of belts above the plastic sheet material along each edge, and also a pair of belts below the plastic sheet material along each edge, and aligned with the upper belts. The belts preferably are backed up by suitable rollers or guide means to maintain sufficient clamping pressure on the edges of the material. Subsequent treatment of the plastic sheet material, as to the molding of the articles is similar to that previously alluded to, and hereafter described in greater detail. Further reference at this point is believed unnecessary, in view of the use of similar reference numerals to those previously used, with the addition of the suffix a. As will be noted adjacent the left hand portion of FIG. 4, the material has been stretched biaxially as indicated by the horizontal and vertical arrows.

Further details on the mandrel or male die member 84, and of the cavities 86 of the die 70 are shown in FIGS. 5 and 6. In these, as well as in subsequent figures, only one mandrel and cavity are shown, but it will be understood that this is representative of the plurality of mandrels and cavities as previously referred to.

The molding head 82 is provided on its undersurface with a mounting plate 156 having an annular ring recess 158 in the vicinity of the mandrel 84 illustrated. The recess 158 provides a central boss 160 which is used for locating the mandrel 84. In addition to the recess 158, the mounting plate 156 is provided with a central bore 162 of relatively large diameter communicating with an air inlet 164 through the molding head 82. As will be appreciated, a manifold or the like is provided to provide air under pressure concurrently to all of the inlets 164, there being one such inlet for each mandrel 84. Air is supplied from any suitable compressor or the like through flexible hoses, or by any other known or satisfactory means.

The mandrel 84 is substantially in the shape of a frustum of a cone, being nipped in slightly at the center at 166, and also provided with a step 168 near the bottom. The mandrel is provided with a central bore 170 of the same diameter as the bore 162, and the lower end of the mandrel is countersunk at 172. The bottom surface of the mandrel between the outer edge and the countersink is concave downwardly at 174, this bottom lying on the surface of a shallow cone. A plug 176 is received in the bore 162 at the lower end thereof, and has a head or flange 178 received in the countersink 172. A bolt 180 extends through the plug and is threaded into a tapped aperture 182 in the molding head 82. The plug is provided with axial openings 184 whereby air under pressure entering through the inlet 164 will pass through the bores 162 and 170, and through the openings 184 into the countersink 172. It will be apparent that the upper end of the mandrel is provided with a relatively large countersink 186 receiving the boss 160 of the mounting plate 156.

It has been found that one essential feature of the mandrel 84 is that it does not extract any substantial amount of heat from the material being molded. As will be appreciated, when heat is extracted from the plastic sheet material being molded, the sheet loses its plasticity and resists further forming or deformation. A limited degree of cooling of the material upon contact with the mandrel is desirable to prevent unwanted sliding of the material over the entering end of the mandrel, but it is imperative that the sheet be not substantially chilled by the mandrel. Another essential is that the sheet material must not slide in an uncontrolled manner over the bottom end of the mandrel. Such sliding results in thinning of the sheet material in the vicinity of the bottom of the mandrel with a resulting thin bottom for the cup or other container.

The mandrel, as shown in FIGS. 5 and 6, is made of metal. In order to avoid extraction of heat from the sheet plastic material by the metal mandrel, there is provided a heater 186 within the mandrel. The heater is illustrated as being an electric heater having lead wires 188 but it will be understood that steam or other suitable heating means can be used to maintain the temperature of the metal mandrel at the desired temperature. It should be emphasized that the mandrel does not heat the sheet material, which has been found to work satisfactorily at a relatively cool temperature of 240–260° F. The metal mandrel, such as aluminum or steel, has been found to operate satisfactorily at substantially 125° F. or 250° F. There is no known explanation at the present time as to why two such widely separated temperatures operate satisfactorily. Structure or means by which anti-skid or anti-slipping qualities are imparted to the entering end of the mandrel will be discussed hereinafter.

The cavity 86 of the die or mold 70 is aligned with the corresponding mandrel 84, and may be provided by an insert or liner 188. The liner is provided with a generally frusto-conical cavity, indented somewhat at the center at 190, complementary to the nipped-in center portion 166 of the mandrel. Above the section 190, the cavity is provided with a plurality of small steps 192. In the illustrative embodiment there are nine such steps, and each has a slightly backward or reverse taper. Adjacent the bottom of the cavity 86, and opposite the indentation or step 168 of the mandrel with the mandrel and cavity in telescoped relation, the sidewall of the cavity flares slightly outwardly as at 194 to provide a shelf or step 196. At the bottom of the reverse taper section 194 there is a shelf or step 198, and from this position the sidewall tapers in at 200 to a position 202 of minimum diameter, and then tapers outwardly again at 204 to join a flat bottom 206.

A bushing 208 is inserted in a bore 210 in the bottom of the liner 188 and journals the stem 212 of an ejector 214 having a head 216, the ejector rather closely resembling a poppet valve in appearance. The lower end of the stem 212 is provided with an enlarged head formed, for example, by a washer 218 and the head 220 of a screw or bolt threaded into an axial bore in the bottom end of the stem. A helical spring 222 encircles the lower end of the stem 212 and is compressed between the bottom end of the bushing end 208 and the washer 218. Accordingly, the ejector is normally held down in the position shown in FIG. 6. However, with the die and mold cavities in the extreme lowered position as in FIGS. 2 and 5 (it will be appreciated that the close spacing of the mandrel and mold cavity in FIG. 5 is for economy of space in the drawings, since the mold cavity actually is spaced substantially below the mandrel, as in FIG. 2), the heads 220 bottom on a stop member 224 fixed on the machine frame, and thereby raise the ejectors 214 against the action of the spring 222 to the position shown in FIGS. 2 and 5.

The head 216 has a flat undersurface 226 adapted to fit against the upper surface of the bushing 210 and the bottom surface 206 of the mold cavity. Adjacent the outer periphery of the head, the under surface tapers upwardly as a frusto-conical surface 228 to a position of maximum diameter 230 substantially contact the minimum diameter section 202 of the mold cavity. Above this, the head tapers in on an upper surface 232, comprising a portion of a rather shallow cone, and joins a top surface section comprising an even more shallow cone at 234. The section 232 substantially underlies the frusto-conical undersurface 174 of the mandrel, while the section 234 lies radially inwardly thereof.

The mold or die 70 is provided with an annular upstanding extension 236 having a frusto-conical inner surface 238 of rather narrow taper angle. The upper edge of the extension 236 is rounded over at 240, and is provided with a step 242 spaced below the rounded over edge. The outer portion of the extension 236 below the shelf or step 242 is cylindrical as at 244.

During the process of forming a cup or the like, the die 70 is raised by the cams 62. The heads 220 leaves the stop 224, and the springs 222 force the ejectors 214 down to the bottoms of the mold cavities, as in FIG. 7. The rounded over upper edges or rims 240 of the extensions 236 engage the web or sheet of heated plastic material 138 and hold it tightly against the plate 90. Contact of the upper curved edge or rim 240 of the extension 236 against the plastic sheet material 138 holds the plastic sheet material up against the plate 90. The plastic sheet material tends to sag initially, but this tendency is resisted to a substantial extent by the biaxial stretching of the material, as previously discussed. The plastic material is chilled where it engages the plate and the mold rim, and hence is more or less set in these areas to resist stretching and deformation. Hence, the area overlying the cavity is rather well defined as the area of material to be formed into a cup or the like. This is an advantageous feature in that the thickness of the cup sidewall and bottom thus can be controlled quite closely. Such control would not be possible if an indeterminate area were being stretched. Engagement of the bottom of the mandrel against this predetermined area mechanically draws the material down into the mold cavity. The anti-skid or anti-slip characteristics of the bottom of the mandrel, to be discussed in greater detail hereinafter, prevent the mandrel from tending to punch through the material, and thus to form a thin spot. Thus, the area to form the bottom of the cup is determined rather precisely. Mechanical drawing of the plastic material by downward movement of the mandrel causes the material to neck down, and more or less to adhere to the mandrel. Hence, the material is mechanically drawn almost completely into the cavity before it engages any part of the cavity, and air pressure immediately is injected into the mechanically drawn cup or container to force it out against the mold cavity, thus determining the final configuration of the cup, which is sufficiently chilled upon engagement with said cavity to prevent further deformation. gagement with said cavity to prevent further deformation. the mounting plate 156, the plastic sheet material is folded back over the rim 240 to form a lip on the cup being formed. Such engagement between the plate 156 and the rim 240 chills the plastic material enough so that it becomes more or less hard. Accordingly, it anchors itself firmly over the rim 240 for holding the drawn area accurately in place. The lower edge of the plate 156 adjacent the recess 158, as at 246 is rather sharp, and acts with the corner of the shelf 242 to sever the deformed sheet material or cup from the sheet stock 138. The spacing between the inner surface of the plate where it defines the outer circumference of the recess 158 and the confronting outer surface adjacent the rounded rim 240 is somewhat less than the sheet stock 138. Accordingly, the depending edge portion of the cup as at 248 is pinched between the projection or extension 236 and the plate 156, and hence forms a tight seal preventing escape of air at this location.

It will be observed that with the mandrel and mold cavity fully telescoped as in FIG. 6 that there is very little space between them. As a result, the cup or the like is largely formed mechanically, and is only partially blown to its final form. In particular, it has been found that when the blowing is such as to increase the size of the partially formed cup by no more than 10 percent, a superior article results. Furthermore, it will be observed that the large area of the recess 172, forming the entrance for the air into the partially formed cup positively prevents any jet action tending to blow dimples or the like into the plastic material. Hence, a smooth walled article results.

Figure 21:
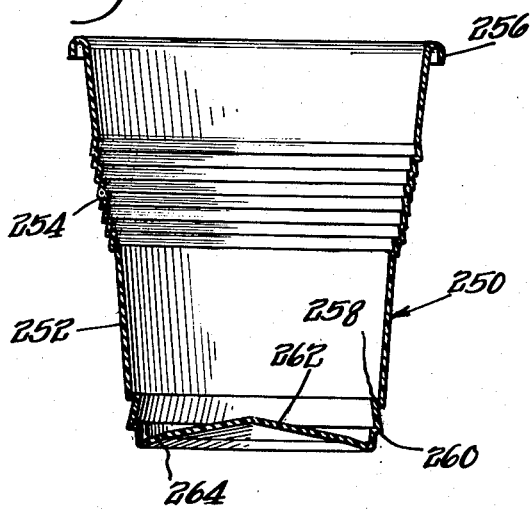
FIG. 21 is a longitudinal sectional view through a finished cup or the like produced by the machine disclosed herein.

A cup 250 is formed in accordance with the apparatus and operation thereof heretofore described is shown in FIG. 6 before removal from the die or mold, and is shown after removal in FIG. 21. As will be seen, the cup has a configuration complementary to the sidewalls of the mold cavity, including the upstanding section 238. In short, the cup has a more or less frusto-conical sidewall 252 with an intermediate stepped portion 254. This portion provides rigidity for the sidewalls, and further provides an area of minimum contact whereby the cup can be held with hot coffee therein without burning the fingers. At the top edge, the cup has a rolled over flange or rim 256. At the bottom, the cup is stepped at 258 and 260, thus facilitating stacking of a series of cups in nested relation without jamming together of the cups. The bottom is substantially conical, as at 262, having an outer edge portion of slightly greater taper at 264 providing greater rigidity for the bottom, and also providing a sharp outer edge which enhances the rigidity of the bottom portion of the cup, and which also provides a small area of contact with the fingers for minimum heat transfer.

A modification of the invention which is adapted to produce containers having flat upper edges or flanges, rather than rolled over rims, is shown in FIG. 7. Parts in this figure corresponding to parts previously disclosed are identified by similar numerals with the addition of the suffix b. In this instance, the mounting plate 156b is secured and supported beneath the molding head 82b by coil springs 266. Hence, when the molding head is lowered the mounting plate 156b is resiliently pressed down. The mounting plate 156d is provided with a recess 158b, as in the previous embodiment. The mandrel has been omitted for clarity of illustration, since it plays no part in this modification, other than that previously disclosed. Similarly, no central boss has been shown in the recess 158b, but it will be understood that one could be provided. The inner configuration of the recess 158b is cylindrical, as at 246b.

The upper end of the extension 238b of the mold is cut off at 242b straight across. The outer corner cooperates with the inner corner of the recess to shear off the material. A ring 268 is fixed within the recess 158b, and clamps the outwardly extending flange 270 of the cup or container 250b against the top 242b of the extension 238b, whereby the flat rim or flange 272 is formed on the container. As will be appreciated, the flange is held tightly due to the force of the springs 266, thereby preventing escape of air from the container as it is blown.

The sequence of operation in mechanically drawing and then blowing a container is shown in FIGS. 8–11. Specifically, this sequence is concerned with the formation of a cup 250 in accordance with the structure shown specifically in FIGS. 5 and 6. The structure shown in FIGS. 8–11 is the same as in FIGS. 5 and 6, although some simplification has been resorted to for simplicity of drawings. In addition, a further part is shown that was omitted from FIGS. 5 and 6 in order to allow the inclusion of these two figures on a single sheet and to a rather large scale. In particular, the additional part comprises a clamping ring 274 associated with each mold or cavity section and having an aperture 276 therein of the same size, and aligned with the aperture 92 in the plate 90. Each clamping ring 274 is provided with a depending peripheral skirt 278, forming more or less a seat receiving the upper end of a helical compression spring 280. The bottom of the spring rests on a plate 282, common to all of the mold cavities and forming a part of the mold structure 70.

The parts are shown in retracted position in FIG. 8, with the molding head 82 raised so that the mandrels 84 are above the clamping plate 90, and with the molding head 70 fully lowered so that the ends 220 of the ejectors 214 rest on the stop 224 and project above the tops of the cavities 86, the springs 222 being compressed. In this position, the spring 280 holds each ring 274 above its corresponding cavity of mold section. In the course of a cycle of operation the molding head 70 is first raised so that each ring 274 abuts the sheet of plastic stock 138 to clamp it against the plate 90 in the vicinity of the respective apertures 92. This provides extremely precise control of the amount of plastic sheet material that will be devoted to forming each cup.

The parts then move from the position of FIG. 9 to the position of FIG. 10 wherein the head 82 is lowered to project the mandrels 84 through the apertures 92 and 276, whereby to stretch or draw the plastic sheet material mechanically down into the corresponding cavity 86. Finally, the cavities and the mold 70 are raised to the position of FIG. 11, at which time the rim of the cup is mechanically formed and clamped, the cup then being blown to final shape by entrance of compressed air through the openings of channels 164 and 162. As will be understood, the cup is cut off during the operation of forming or clamping the upper ends of the cup.

As will be apparent, in all of the sequence views subsequent to FIG. 8, the spring 222 holds the ejector 214 down. After completion of the cup, lowering of the mold 70 causes the head 222 to abut the stop 224, whereby to force up all of the ejectors 214, and thereby to raise the cups into ejecting position from whence they are blown by air from the jets or orifices 146 in the pipe 144.

FIG. 12 shows a detail at the upper corner of the mold cavity, particularly relating to the cutting off and clamping of the partially formed cup 250. In particular, it will be observed that the spacing indicated at x—x is less than the thickness of the material indicated at y—y. Accordingly, the material is firmly clamped between the plate 156 (the lower portion of which functions as a cutting ring) and the upward extension 238 at the top of the mold cavity. Thus, even after the material is cut off by the sharp lower edge 246 against the step 242, the partially formed cup is completely sealed to the mandrel and associated parts for proper blowing of the cup to finished position.

The clamping or squeezing of the depending rim 256 of the cup not only insures a substantially perfect pneumatic seal, but also insures against dragging of the material over the rounded upper edge 240 of the projection or extension 238. Such dragging further is inhibited by the initial prechilling or very slight cooling of the material as it is contacted by the extension 238. The holding or securing action is augmented in accordance with the modification of the invention shown in FIG. 13. In this form of the invention parts are similar to those previously identified, and are identified by similar numerals with the addition of the suffix c. The distinguishing feature is that above the step 242c on the outer surface of the upward extension 238c, there is provided a series of vertically spaced annular rings of V-shaped cross-sections. As will be understood, the plastic material 238c is slightly soft, and accordingly a certain amount of it is extruded into the rings to provide projections 286 complementary to the rings or grooves 284 and lockingly interfitting therewith.

Somewhat the same action is provided in the modification of FIG. 14, similar parts again being identified by similar numerals, this time with the addition of the suffix *d*. In this form of the invention the step 242*d* is set over somewhat at 288 to provide an enlargement at the bottom of the depending cup rim 256*d* received in a deepened portion of the upward extension 238*d*. This functions in a manner similar to the embodiment of FIG. 13 positively to anchor the depending rim of the cup, and thereby to prevent any dragging of this portion of the cup over the rounded top edge 240*d*.

As heretofore has been indicated, it is an essential requisite of the mandrel that the mandrel extract no substantial amount of heat from the plastic sheet material being formed into a cup or other container. Furthermore, it has been indicated that the entering end of the mandrel must be possessed of certain frictional qualities to prevent sliding of the sheet material over the mandrel with accompanying thinning of the material subsequently forming the bottom of the cup. Both of these features are illustrated in various embodiments of the invention as hereinafter set forth in connection with FIGS. 15–20.

Figure 15:
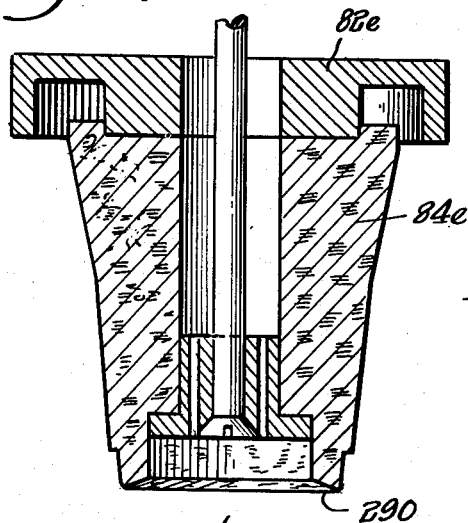
FIG. 15 is a longitudinal sectional view through a mandrel made of a different material, and forming a modification of the invention.

Thus, the mandrel 84*e* indicated in FIG. 15 is made of pressed cork. The cork could be in its natural state, but it generally is preferable to use pressed cork in manufactured articles, due to the difficulties and expense of securing perfect cork specimens of proper size. In any event, the cork mandrel 84*e* has excellent insulating qualities, and hence does not extract heat from the plastic sheet material. Furthermore, the entering end 290 has friction properties, as this is an inherent characteristic of cork that has not been glazed or otherwise made antifrictional in nature. It will be observed that the cork does not need heating as does the metal mandrel.

Figure 16:
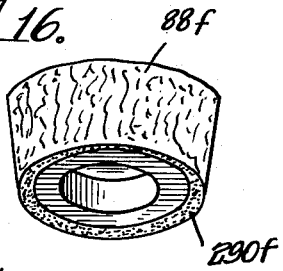
FIG. 16 is a fragmentary perspective view showing a further modification of the mandrel.

The mandrel 82*f* indicated fragmentarily in FIG. 16 is made of wood. The wood also has good natural insulating qualities, but is inclined to have a smooth surface which does not have the requisite frictional characteristics. Thus, the entering end 290*f* is roughened to prevent sliding of the plastic material thereover.

Figure 17:
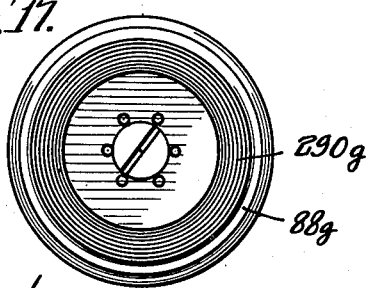
FIG. 17 is an end view of the mandrel showing another embodiment of the invention.

The mandrel 88*g* shown in FIG. 17 may be either of wood or metal. This particular embodiment of the invention is shown to indicate the formation of annular rings on the entering end 290*g* to provide frictional properties.

Figure 18:
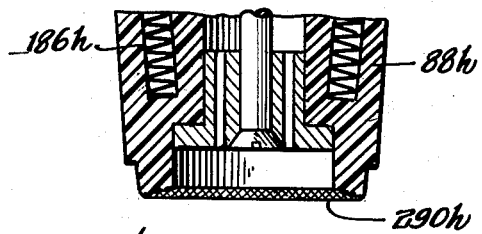
FIG. 18 is a fragmentary vertical sectional view through a mandrel showing yet another embodiment thereof.

In FIG. 18 there is shown a mandrel 88*h* made of nylon or other suitable plastic. The entering end 290*h* is roughened. Although nylon and other plastics have better insulating properties than metal, they are not, in all instances, as good as cork or wood. Hence, heating elements 186*h* may be incorporated, and may be operated intermittently, or as needed in order to prevent unwanted extraction of heat from the plastic sheet material by the mandrel.

Figure 19:
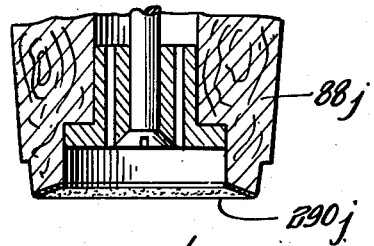
FIG. 19 is a view similar to FIG. 18 showing yet another embodiment.

A further modification is shown in FIG. 19. In this mandrel, identified by the numeral 88*j*, the construction may again be of wood. The distinguishing feature of this modification is the provision of an entering end 290*j* comprising a ring of sand paper or the like to provide frictional qualities.

Figure 20:
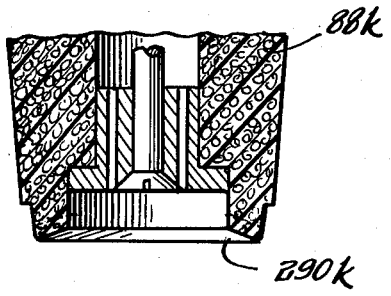
FIG. 20 is a view similar to FIGS. 18 and 19 and showing a further embodiment.

A further modified mandrel is shown at 88*k* in FIG. 20. This mandrel is made of high temperature foam plastic which has excellent insulating qualities, and also has the requisite frictional qualities at the entering end 290*k*.

From the foregoing, it will be apparent that there has been herein disclosed a machine for forming cups or other containers from plastic sheet material, such as modified polystyrene. The cups are initially mechanically preformed almost to finished size and shape, and then are blown by air pressure to the final shape. It will be apparent that most of the formation is mechanical, only substantially ten percent or less of the formation being pneumatic. It will be apparent that it is the differential in air pressure that causes expansion, and it is therefore contemplated that the air introduced into the interior of the sealed partially formed cup might be at atmospheric pressure or less, as long as the pressure on the outside of the cup is below the pressure of the air introduced. Obviously, other gases than air could be used.

The mandrel itself extracts no substantial heat from the plastic sheet material, and hence does not tend to "set" the material. However, the clamping rings securing the material against the clamping plate do cause a certain amount of setting of particular sections of the material, precisely determining the area of material which will go into a finished cup. Accordingly, extreme uniformity is found in the cups. The frictional qualities of the mandrel, particularly the entering end thereof, prevent slipping of the plastic material across the end of the mandrel. Accordingly, extreme uniformity of wall thickness (including the bottom) is produced in the cups.

It will be seen that it is possible to cut off the cups before blowing thereof, since the turning over of the upper ends provides the gripping action which, in the case of cups having downturned rims, is augmented by the tight fit of the adjacent parts of the molding head and mold cavity. Such gripping anchors the upper end of the cup and also provides a good pneumatic seal.

The frictional qualities of the lower or entering end of the mandrel allow operation at lower temperatures than heretofore thought possible. The manufacturers of the plastic sheet material recommend a working temperature of 300° to 325° F. This is uncomfortably close to the kindling temperature of 360° to 400° F., and prolonged exposure of the sheet material to the heaters, as upon a work stoppage, could readily cause the material to catch on fire. It has been found that the frictional entering end of the mandrel allows satisfactory operation at 240° to 260° F. This relatively low operating temperature also depends on the fact that the mandrel extracts no substantial amount of heat from the material.

Various changes in structure will no doubt occur to those skilled in the art relative to the exemplary embodiment heretofore set. Such changes will be understood as forming a part of this invention, insofar as they fall within the spirit and scope of the appended claims.

I claim:

1. A machine for forming thin-walled plastic containers comprising a mold having a plurality of cavities therein complementary in shape to the container and each having an open mouth, a plurality of mandrels respectively spaced from said mold cavities and axially aligned therewith, a plate interposed between said mandrels and said mold cavities, said plate being movable relative to said mandrels and said mold cavities and having a plurality of apertures therein respectively slightly larger than the open mouths of the mold cavities and aligned therewith, transport means engageable with edge portions of a sheet of plastic material spaced from said mandrels and mold cavities to position said sheet of plastic material adjacent said plate and intermediate said mandrels and said mold cavities, means for clamping a plurality of sections of said sheet against the face of said plate disposed toward said mandrels, intermediate said transport means and adjacent said apertures accurately to determine the areas of plastic material to form a plurality of containers, spring means mounting said clamping means from said mold forwardly of said mold toward said plate and biasing said clamping means toward said plate, means for advancing said mandrels and said mold cavities relatively toward one another and toward said plate whereby mechanically to draw said sections of plastic sheet material into said cavities, said clamping means clamping said plastic material against said plate before engagement of the mandrel with said plastic material whereby to determine the area of sheet plastic material to be drawn, means for sealing off the mechanically drawn sheet material sections, said sealing means including a cylindrical portion on each mold projecting toward the corresponding mandrel, each said cylindrical portion having a shoulder spaced toward the mold from the extremity of the cylindrical portion nearest to the mandrel, the cylindrical portion disposed axially toward the mandrel from the shoulder being provided with annular groove means into which a portion of the plastic sheet material is extruded for anchoring said plastic sheet material, and means for establishing a differential of fluid pressure across each mechanically drawn sheet material section to expand the same into conforming engagement with the mold cavities.

2. A machine for forming thin-walled containers of thermoplastic material comprising a mold having a cavity complementary in shape to the containers and having an open mouth, a mandrel spaced from said mold cavity and axially aligned therewith, said mandrel throughout the major portion of transverse sections thereof being heat insulatable to avoid extraction of heat from said heated thermoplastic material, said mandrel having an entering end confronting the open mouth of said mold cavity which is provided with means establishing a high frictional resistance to slippage of sheet thermoplastic material thereover, means for positioning a sheet of such thermoplastic material heated to a plastic temperature intermediate said mandrel and said mold cavity, means for advancing said mandrel and said mold cavity relatively toward one another whereby mechanically to draw a section of said plastic sheet material into said cavity, and means for severing the section of material adjacent the base of said mandrel.

3. A machine as set forth in claim 2 wherein the entering end of the mandrel is roughened to provide an interrupted surface having a series of projections thereon.

4. A machine as set forth in claim 2 wherein the entering end of the mandrel is provided with a series of annular rings.

5. A machine as set forth in claim 2 wherein the entering end of the mandrel has a ring of frictional material secured thereto, said ring of frictional material characterized as having an interrupted surface provided with a series of projections.

6. A machine as set forth in claim 5 wherein the friction material is sandpaper.

7. The machine set forth in claim 2 wherein the mandrel is characterized as comprising a generally frustoconical body having side walls and an entering end adapted to engage plastic sheet material, said entering end being of smaller diameter than the opposite end, said entering end having a recess therein encompassed by a ring-like section, said body means having relatively restricted air passage means extending longitudinally therethrough and opening up into said recess to effect expansion and slowing of air passing through said air passage means before impinging against plastic sheet material.

8. The machine set forth in claim 7 wherein the mandrel has an axial bore therethrough of smaller diameter than said recess joining said recess at a shoulder, said mandrel further including a plug having a body fitting in said axial bore and an enlarged head fitting in said recess and terminating short of said mandrel entering end, said plug having a plurality of arcuately spaced axial bores therethrough.

9. A machine as set forth in claim 2 wherein the material of which the mandrel is made has inherent high friction qualities relative to said sheet plastic material.

10. A machine for forming thin-walled containers of thermoplastic material comprising a mold having a cavity complementary in shape to the containers and having an open mouth, a mandrel spaced from said mold cavity and aligned therewith, means for positioning a sheet of thermoplastic material heated to plastic temperature intermediate said mandrel and said mold cavity, said mandrel having an entering end and side walls engageable with said sheet of heated thermoplastic material upon relative advancing of said mandrel toward said mold, at least said entering end and said side walls being of foamed plastic material to control slippage of said material across said mandrel entering end and to avoid extraction of heat from said heated thermoplastic material, and means for relatively advancing said mandrel and said mold toward one another mechanically to draw said material over said mandrel and into said mold cavity.

References Cited by the Examiner

UNITED STATES PATENTS

| | | |
|---|---|---|
| 1,492,510 | 4/24 | De Escobales. |
| 1,793,089 | 2/31 | Heyes. |
| 2,190,807 | 2/40 | Steinberger. |
| 2,260,667 | 10/41 | Hoof. |
| 2,282,423 | 5/43 | Kopitke. |
| 2,348,871 | 5/44 | Wiley. |
| 2,531,539 | 11/50 | Smith. |
| 2,796,634 | 6/57 | Chellis. |
| 2,962,758 | 12/60 | Politis. |
| 3,081,491 | 3/63 | Black. |

WILLIAM J. STEPHENSON, *Primary Examiner*